(No Model.)
H. H. PULVER.
DUST GUARD AND CLEANER FOR BICYCLE BEARINGS.
No. 585,532. Patented June 29, 1897.
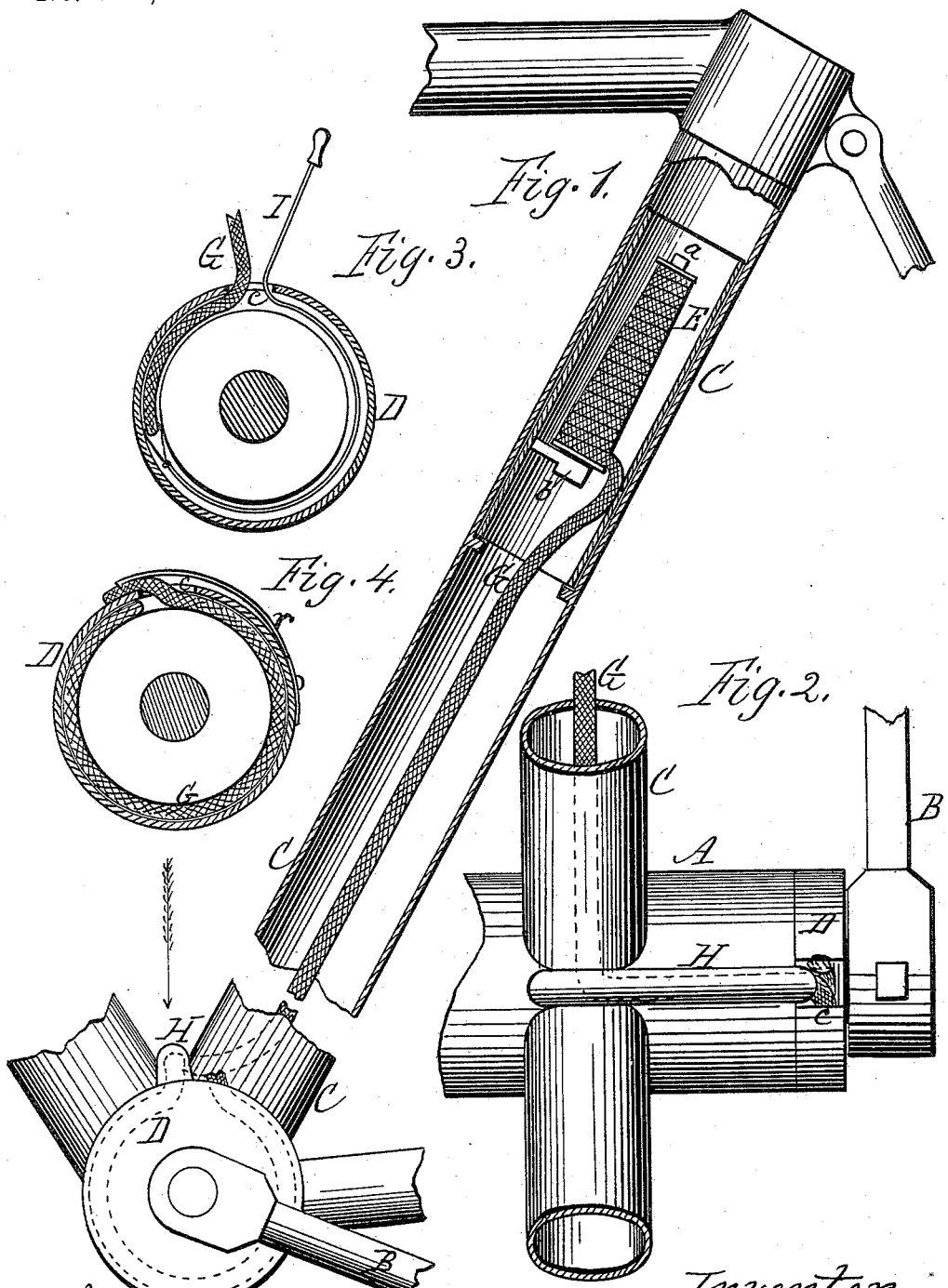
Witnesses.
F. S. Hutchinson.
P. A. Costich
Inventor.
Henry H. Pulver,
by R. F. Osgood,
Atty.

UNITED STATES PATENT OFFICE.

HENRY H. PULVER, OF ROCHESTER, NEW YORK.

DUST-GUARD AND CLEANER FOR BICYCLE-BEARINGS.

SPECIFICATION forming part of Letters Patent No. 585,532, dated June 29, 1897.

Application filed February 14, 1896. Serial No. 579,269. (No model.)

*To all whom it may concern:*

Be it known that I, HENRY H. PULVER, of Rochester, in the county of Monroe and State of New York, have invented a certain new and useful Improvement in Dust-Guards and Cleaners for Bicycle-Bearings, &c.; and I do hereby declare that the following is a full, clear, and exact description of the same, reference being had to the drawings accompanying this application.

My improvement relates to means for packing bicycle-bearings to exclude dust and also to remove grease; and the invention consists in the combination and arrangement of parts hereinafter described and claimed.

In the drawings, Figure 1 is a sectional side view of part of the frame of a bicycle with my improvement attached. Fig. 2 is a plan view of a portion of the same looking downward from the arrow in Fig. 1. Fig. 3 is a cross-section of the end of the bearing, showing the means for inserting the packing. Fig. 4 is a similar view with the packing in place.

My improvement is applicable to any of the bearings of a bicycle and also to the bearings of other vehicles. As shown in the drawings it is applied to the crank shaft or axle of a bicycle.

A indicates the hub, and B one of the cranks. C is the rear tubular upright of the bicycle-frame, the same being the part which supports the saddle.

D is a flanged cap fitted over the end of the bearing and serving to hold the packing. The cap is closed at one end and open at the other to fit the bearing.

E is a spool of small diameter fitted within any one of the tubes of the frame or in a receptacle communicating with the tubing and having wound upon it the packing G, which consists of some fibrous material in the form of wicking. The spool rests on a spindle $a$, attached to a bearing $b$, fitted removably in the tube, which insures the easy turning of the spool. The end of the packing-cord is carried down through the tube and into a small cross-tube H, which conducts it to a hole $c$ made in the cap D. At this point it is attached to an inserting device consisting of a spring I, which is inserted from the opposite direction and extended through the annular space between the cap and the bearing. The spring with the packing attached is then drawn through the annular space till the end of the packing has made the circuit and appears through the opening, when the spring is detached and the packing is left in place. This packing, by filling the annular passage, excludes dust. It also absorbs surplus oil and prevents it from running out. When that portion of the packing in the cap becomes saturated, it is drawn out and the soiled part is cut off, leaving a new supply in the cap. The surplus packing on the spool furnishes a large and continuous supply, and the same is fed by consecutive charges through the cap. In this manner the bearing can be kept clean with very little trouble. Instead of a spool a ball of surplus packing can be used and stored in any suitable reservoir for the purpose.

When the packing has been drawn through the cap, the loose end is fastened by a notched spring $r$, removably attached to the cap, the notches of the end of the spring clamping down on the projecting end of the packing, as shown in Fig. 4.

Having described my invention, what I claim as new, and desire to secure by Letters Patent, is—

1. The combination, with the hollow cap covering the end of the bearing, of the spool provided with surplus packing continuously fed through the tube into and through the cap, in the manner and for the purpose specified.

2. The combination, with the hollow cap provided with an opening, of a spool in the frame-tubing provided with packing, and a cross-tube connecting the tubing with the cap, the said tubing and cross-tube forming a conduit for the passage of the packing into and through the cap, as and for the purpose specified.

3. The combination, with the cap and the spool provided with surplus packing, of the toothed spring attached to the cap and clamping the loose end of the packing, as herein shown and described.

In witness whereof I have hereunto signed my name in the presence of two subscribing witnesses.

HENRY H. PULVER.

Witnesses:
R. F. OSGOOD,
F. B. HUTCHINSON.